United States Patent [19]

Fodale

[11] Patent Number: 5,202,833
[45] Date of Patent: Apr. 13, 1993

[54] METHOD OF CONTROLLING THE PARTIAL LOCK-UP OF A TORQUE CONVERTER IN AN ELECTRONIC AUTOMATIC TRANSMISSION SYSTEM

[76] Inventor: Francis M. Fodale, 16996 Madoline, Beverly Hills, Mich. 48809

[21] Appl. No.: 691,151
[22] Filed: Apr. 23, 1991

Related U.S. Application Data

[63] Continuation of Ser. No. 399,682, Aug. 28, 1989, abandoned.

[51] Int. Cl.$^5$ ................ B60K 41/02; F16D 31/08
[52] U.S. Cl. .................... 364/424.1; 74/866; 192/3.58
[58] Field of Search ............... 74/866; 364/424.1; 192/0.052, 0.056, 3.3, 3.31, 3.58

[56] References Cited

U.S. PATENT DOCUMENTS

| | | | |
|---|---|---|---|
| 3,876,028 | 4/1975 | Asano et al. | 74/866 |
| 3,881,368 | 5/1975 | Furuhashi et al. | 74/866 |
| 3,882,740 | 5/1975 | Forster et al. | 74/866 |
| 3,895,541 | 7/1975 | Nohira et al. | 74/866 |
| 3,942,393 | 3/1976 | Forster et al. | 74/866 |
| 4,030,380 | 6/1977 | Mutter | 74/866 |
| 4,044,634 | 8/1977 | Florus et al. | 74/866 |
| 4,073,204 | 2/1978 | Dick | 74/866 |
| 4,082,013 | 4/1978 | Dornfeld et al. | 74/866 |
| 4,131,036 | 12/1978 | Ivey et al. | 74/866 |
| 4,148,230 | 4/1979 | Kodama et al. | 74/859 |
| 4,174,645 | 11/1979 | Ohmae et al. | 74/866 |
| 4,208,925 | 6/1980 | Miller et al. | 74/866 |
| 4,220,058 | 9/1980 | Petzold | 364/424.1 |
| 4,224,842 | 9/1980 | Rabus et al. | 74/866 |
| 4,244,244 | 1/1981 | Rembold et al. | 74/866 |
| 4,258,591 | 3/1981 | Eckert et al. | 74/866 |
| 4,259,882 | 4/1981 | Miller | 74/866 |
| 4,283,970 | 8/1981 | Vukovich | 74/866 |
| 4,285,252 | 8/1981 | Yamaki et al. | 74/866 |
| 4,290,322 | 9/1981 | Huitema | 475/128 |
| 4,345,489 | 8/1982 | Muller et al. | 74/866 |
| 4,368,649 | 1/1983 | Vahratian et al. | 475/66 |
| 4,380,048 | 4/1983 | Kishi et al. | 364/424.1 |
| 4,428,467 | 1/1984 | Hiramatsu | 192/3.31 |
| 4,452,099 | 6/1984 | Croswhite | 475/66 |
| 4,456,107 | 6/1984 | Ito et al. | 74/866 |
| 4,457,411 | 7/1984 | Hiramatsu | 192/0.076 |
| 4,468,988 | 9/1984 | Hiramatsu | 74/868 |
| 4,468,989 | 9/1984 | Rosen | 74/869 |
| 4,485,443 | 11/1984 | Knodler et al. | 364/424.1 |
| 4,503,734 | 3/1985 | Acker | 74/866 |
| 4,527,448 | 7/1985 | Person et al. | 74/869 |
| 4,527,678 | 7/1985 | Pierce et al. | 74/866 |
| 4,535,412 | 8/1985 | Cederquist | 364/424.1 |
| 4,541,308 | 9/1985 | Person et al. | 74/868 |
| 4,560,047 | 12/1985 | McCarthy et al. | 192/52 |
| 4,570,770 | 2/1986 | Nishikawa et al. | 192/0.052 |
| 4,584,906 | 4/1986 | Nagaoka et al. | 74/866 |
| 4,586,401 | 5/1986 | Nogle | 475/60 |
| 4,637,281 | 1/1987 | Vanselous | 74/869 |
| 4,658,929 | 4/1987 | Katou et al. | 74/868 |
| 4,660,672 | 4/1987 | Katou | 74/868 |
| 4,660,697 | 4/1987 | Yoneda et al. | 192/0.052 |
| 4,667,540 | 5/1987 | Yagi | 74/866 |
| 4,680,988 | 7/1987 | Mori | 74/866 |
| 4,693,142 | 9/1987 | Kurihara et al. | 74/866 |
| 4,706,790 | 11/1987 | Lockhart et al. | 192/3.3 |
| 4,707,789 | 11/1987 | Downs et al. | 364/424.1 |
| 4,711,138 | 12/1987 | Miura et al. | 475/143 |
| 4,724,723 | 2/1988 | Lockhart et al. | 74/854 |
| 4,725,951 | 2/1988 | Niikura | 364/424.1 |
| 4,757,886 | 7/1988 | Brown et al. | 192/3.3 |
| 4,766,544 | 8/1988 | Kurihara et al. | 364/424.1 |
| 4,926,994 | 5/1990 | Koshizawa et al. | 192/0.052 |
| 4,940,122 | 7/1990 | Fujieda | 192/3.31 |
| 4,993,527 | 2/1991 | Benford et al. | 192/76 |

OTHER PUBLICATIONS

Takeo Hiramatsu, et al., "Control Technology of Minimal Slip-Type Torque Converter Clutch," SAE Technical Paper 850460 (1985).

M. Suga, et al., "The Control of the Lockup Clutch Used in The Microprocessor Controlled Automatic Transmission," 1 Mech. E. (1985).

*Primary Examiner*—Vincent N. Trans
*Attorney, Agent, or Firm*—Mark P. Calcaterra

[57] ABSTRACT

The present invention provides a method for controlling the partial frictional engagement between the torque converter and the vehicle engine called "partial lock-up" mode of operation to reduce the rotational speed difference between torque converter and the engine. The present invention eliminates surges that occur for partial lock-up which may result in a harsh shift.

6 Claims, 9 Drawing Sheets

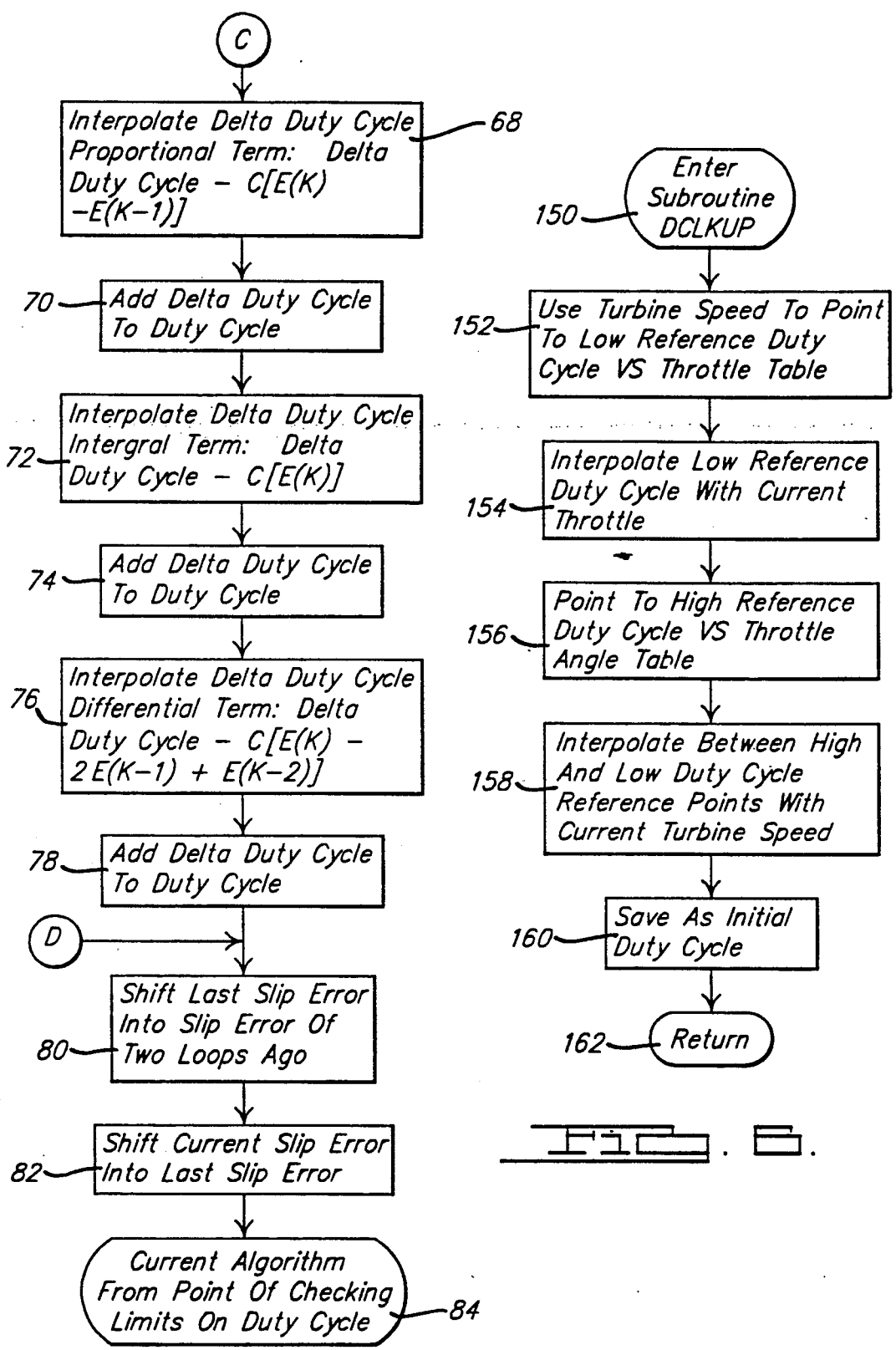

METHOD OF CONTROLLING THE PARTIAL LOCK-UP OF A TORQUE CONVERTER IN AN ELECTRONIC AUTOMATIC TRANSMISSION SYSTEM

This is a continuation of U.S. patent application Ser. No. 07/399,682, filed Aug. 28, 1989 now abandoned.

BACKGROUND OF THE INVENTION

1. Field of the Invention

The present invention relates to an automatic transmission primarily intended for motor vehicle use, and more particularly, to a method of controlling the partial frictional engagement or lock-up between a vehicle engine and a torque converter in a transmission that is controlled electronically and hydraulically.

2. Description of Related Art

A conventional transmission includes a hydrodynamic torque converter to transfer engine torque from the engine crankshaft to a rotatable input member of the transmission through fluid-flow forces. Although the idea of locking up the torque converter has been around for many years, few transmissions incorporated this feature before the fuel economy crunch of the '70s, because the fuel economy benefit of eliminating torque converter slip was not worth the driveability penalty that invariably resulted from eliminating the torque converter's damping effect. Until recently, all torque converter lock-up was of the full lock-up variety, e.g., the lock-up clutch would fully engage and prevent any slip. Engine torsional vibrations would mostly be absorbed in damper springs located between the lock-up clutch and the turbine hub (transmission input). The lower limit for engine r.p.m. depended on damper rate, number of cylinders, etc.; below this limit, high frequency vibrations ("Torsionals") made lock-up operation objectionable. In some cases, however, lower frequency disturbances, e.g., surge or bucking, raised this limit.

An alternative to the above is partial lock-up, a.k.a. controlled slippage of the lock-up clutch, which is disclosed in U.S. Pat. No. 4,468,988, issued Sep. 4, 1984, to Hiramatsu. No damper is necessary with this approach. Lock-up clutch capacity is modulated to control lock-up clutch slip at some desired value, perhaps 50 r.p.m. The engine's torsionals go to its own inertia, resulting in an engine speed variation of perhaps plus or minus 30 r.p.m., so the clutch slips continuously. Thus, the input torque to the transmission equals clutch capacity.

Currently, a method has been developed for determining and controlling the lock-up of a torque converter. An example of such a method is disclosed in copending patent application, U.S. Ser. No. 188,603, filed Apr. 29, 1988, entitled "Method of Determining and Controlling the Lock-Up of a Torque Converter in an Electronic Automatic Transmission System", which is hereby incorporated by reference. The method determines whether the torque converter is fully locked or unlocked. The method also checks conditions on whether full lock-up operation will be allowed. If the conditions do not allow full lock-up operation, a transmission controller solves equations for partial lock-up for actuating valves in the hydraulic system for partially locking up the torque converter.

3. Objects of the Present Invention

It is one of the principle objects of the present invention to provide a method of determining and controlling a lock-up mode of operation for the torque converter to reduce the rotational speed difference between the torque converter and the vehicle engine.

It is another object of the present invention to eliminate or reduce partial lock-up surge.

SUMMARY OF THE INVENTION

To achieve the forgoing objects, the present invention provides a method for controlling the partial frictional engagement between the torque converter and the vehicle engine called "partial lock-up" mode of operation to reduce the rotational speed difference between the torque converter and the engine. Another feature of the present invention is the elimination of surges that occur for partial lock-up which may result in a harsh shift.

Other objects, features and advantages of the present invention will become more fully apparent from the following detailed description of the preferred embodiment, the appended claims and the accompanying drawings.

BRIEF DESCRIPTION OF THE DRAWINGS

FIG. 5 is a continuation of the flow chart for the partial lock-up methodology of FIGS. 2, 3 and 4.

FIG. 6 is a flow chart of a partial lock-up methodology according to the present invention.

DESCRIPTION OF THE PREFERRED EMBODIMENT

Figure 1:
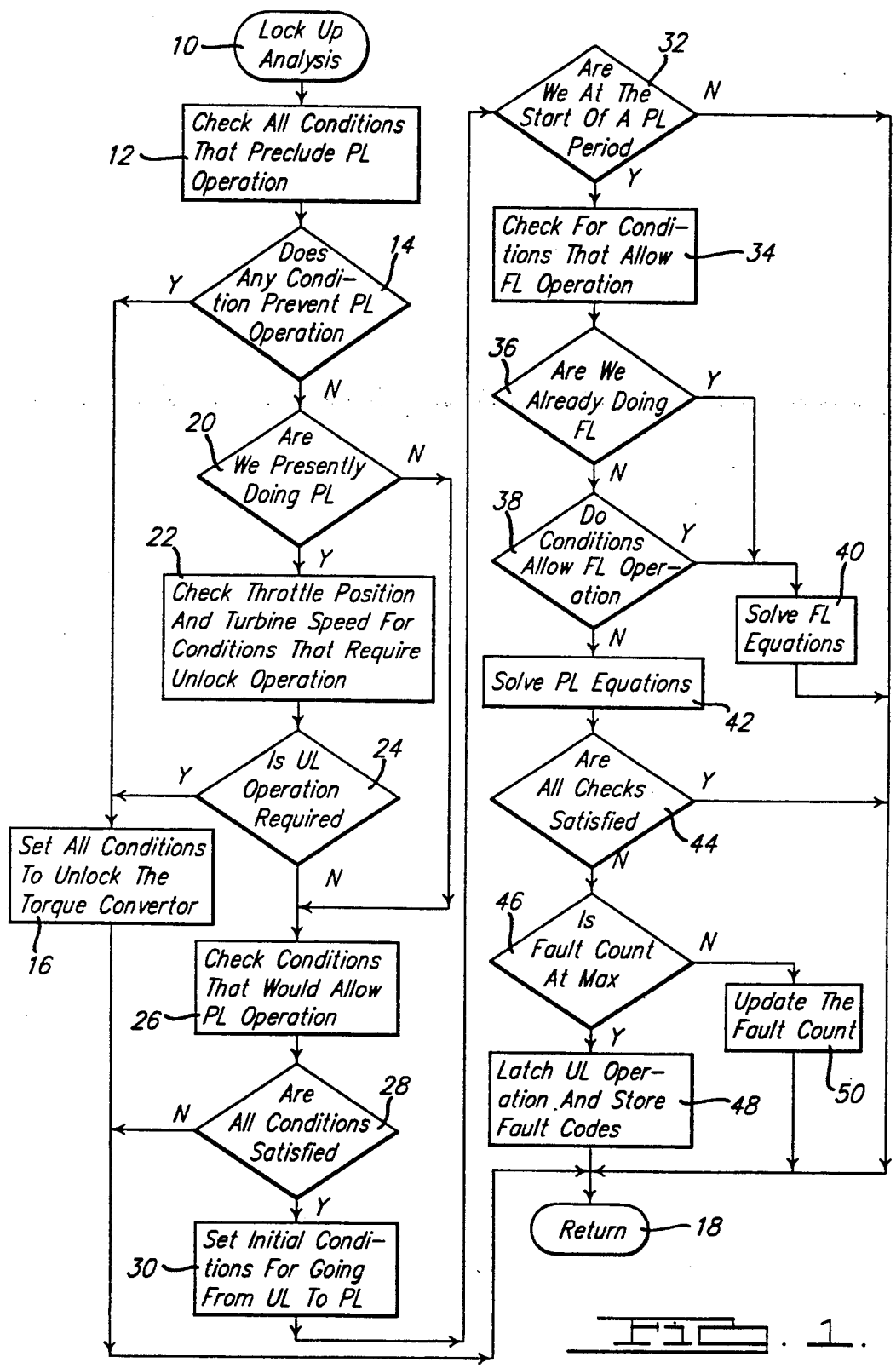
FIG. 1 is a flow chart of a lock-up methodology according to the present invention.

A structure for use with the following method may be found in copending application, U.S. Ser. No. 188,603, previously described and incorporated by reference.

Partial lock-up (PLU) of a torque converter (not shown) for an automatic transmission (not shown) is used in transition from unlock (UL) to full lock-up (FL). This occurs when the transmission is operating in "top gear", i.e. the highest gear available according to a shift lever position (PRNODDL). PLU is used for steady-state slight slippage operation. From either PLU or FL operation, a return to UL operation is effected upon any of the following conditions: throttle angle less than a predetermined angle, e.g., 2 degrees, turbine speed $N_t$ less than a predetermined speed, e.g., 1400 r.p.m. in fourth gear; start of a downshift; start of a speed change in an upshift; or application of the brakes of the vehicle.

In PLU, the methodology controls the initial application of a lock-up clutch assembly (not shown) and maintains a limited slip condition if FL is not used. The duty cycle (DC, % ON period) on a solenoid-actuated valve controlling the lock-up clutch assembly is calculated according to the following:

$$DC = DC(i-1) + \text{delta } DC,$$

where $$\text{deltaDC} = -0.8 \text{ delta DC } (i-1) + K(E_a - A).$$

The methodology attempts to control slip at a predetermined value, e.g. 80 r.p.m. In each 0.028 second cycle, the methodology finds the slip error, which is engine speed $N_e$ minus turbine speed $N_t$ minus a predetermined value such as 80 r.p.m. This and three previous slip errors are used to calculate an anticipated slip error $E_a$. The difference between $E_a$ and an anticipated error modification term A is multiplied by a gain K to give a duty cycle increment term, i.e. either the "ON" or "OFF" time of the solenoid-actuated valve to cycle the lock-up clutch. In effect, this provides a proportional/integral/differential control with some filtering because of the poor quality of the $N_e$ data. The other duty cycle increment term consists of a constant, such as −0.8, times the previous duty cycle increment. This provides a lead/lag to improve system stability.

This basic operation is modified in a number of ways depending on conditions. The gain K is reduced by half in second gear in recognition of the higher plant gain due to higher line pressure. Also, the gain K is high at large errors in order to gain control more quickly, and low at small errors in order to improve stability. The "A" term provides the following features: for values of error above 30 r.p.m., it causes the logic to try to control the rate of error or slip reduction to about 300 r.p.m./sec., rather than controlling the error to zero as above, in order to provide a smooth pull-in; and for values of slip below 10 r.p.m., it backs the duty cycle out somewhat faster than it would otherwise, in order to reduce the exposure to FL torsionals at low $N_t$.

The initial duty cycle is 60% in third or fourth, and 55% in second because of the high line pressure. This value is also the upper limit for the first five cycles. Otherwise, during tip-ins (operator backs off the accelerator pedal of the vehicle), the duty cycle would increment rapidly before the lock-up clutch 186 actuates, causing a sharp pull-in.

For full lock-up, once PLU has brought the slip down to 88 r.p.m., the duty cycle simply increments by 1% per cycle in order to finish the pull-in smoothly. Once 90% is reached, the methodology goes to full ON. In order to prevent immediate FL during tip-ins before the lock-up clutch is applied, 0.25 seconds of PLU is required.

Referring to FIG. 1, a torque converter lock-up methodology is shown. At the start of the lock-up analysis or methodology in bubble 10, the methodology advances to block 12 and checks all conditions that may preclude partial lock-up operation as previously described (i.e. to unlock). The methodology advances to diamond 14 and determines whether any of the conditions in block 12 prevent partial lock-up operation. If any condition prevents partial lock-up operation, the methodology advances to block 16 and sets all conditions (resets all bits in the transmission controller that were used during partial lock-up) to unlock the torque converter of the transmission. The methodology then returns through bubble 18.

At diamond 14, if there are no conditions which prevent partial lock-up operation, the methodology advances to diamond 20 and determines whether the transmission controller is presently partial locking the torque converter by looking for the absence of a flag. If partial lock-up is presently happening, the methodology advances to block 22 and checks the position of the throttle and turbine speed $N_t$ for conditions that require unlock operation as previously described. The methodology advances to diamond 24 and determines whether unlock (UL) operation is required based on the check in block 22. If unlock operation is required, the methodology advances to block 16 previously described to set all conditions to unlock the torque converter.

If partial lock-up is not presently happening at diamond 20 or unlock operation is not required at diamond 24, the methodology advances to block 26 and checks for conditions previously described that would allow partial lock-up operation (i.e. prevent unlock from occurring). The methodology advances to diamond 28 and determines whether all the conditions in block 26 were satisfied. If all the conditions were not satisfied, the methodology advances to bubble 18 and returns.

At diamond 28, if all the conditions in block 26 were satisfied, the methodology advances to block 30 and sets the initial conditions (i.e. bits in the transmission controller) for going from unlock to partial lock-up. The methodology advances to diamond 32 and determines whether the methodology is at the start of a partial lock-up time period, i.e. the starting point of a time period for the duty cycle for controlling or actuating the lock-up clutch. This is accomplished by looking at a counter in the transmission controller which cycles from zero to four (zero being the start of a partial lock-up time period). If the methodology is not at the start of a partial lock-up time period, the methodology advances to bubble 18 and returns.

If the methodology is at the start of a partial lock-up time period, the methodology advances to block 34 and checks for conditions that allow full lock-up (FL) operation (i.e. prevent unlock from occurring). The methodology advances to diamond 36 and determines whether full lock-up of the torque converter is already occurring by looking for a flag as previously described. If full lock-up is not occurring, the methodology advances to diamond 38 and determines whether all conditions checked in block 34 allow full lock-up operation. If all conditions allow full lock-up operation or full lock-up is already occurring at diamond 36, the methodology advances to block 40 and solves the equations, previously described, for full lock-up operation. The methodology then advances to bubble 18 and returns.

At diamond 38, if any of the conditions in block 34 do not allow full lock-up operation, the methodology advances to block 42 to carry out or execute the present invention of FIGS. 2 through 9 to be described, for partial lock-up. The methodology then advances to diamond 44 and determines whether all checks that preclude partial lock-up operation, as previously described, were satisfied. If all checks or conditions were not satisfied, the methodology advances to diamond 46 and determines whether the fault count is at or exceeds a predetermined maximum value. If the fault count is at the predetermined maximum value, the methodology advances to block 48 and performs unlock operation and stores the fault codes in memory of the transmission controller. If the fault count is not at the predetermined maximum value, the methodology advances to block 50 and updates the fault count. The methodology returns from blocks 48 and 50 through bubble 18. Also, if all safety checks were satisfied at diamond 44, the methodology advances to bubble 18 and returns.

Figure 2:
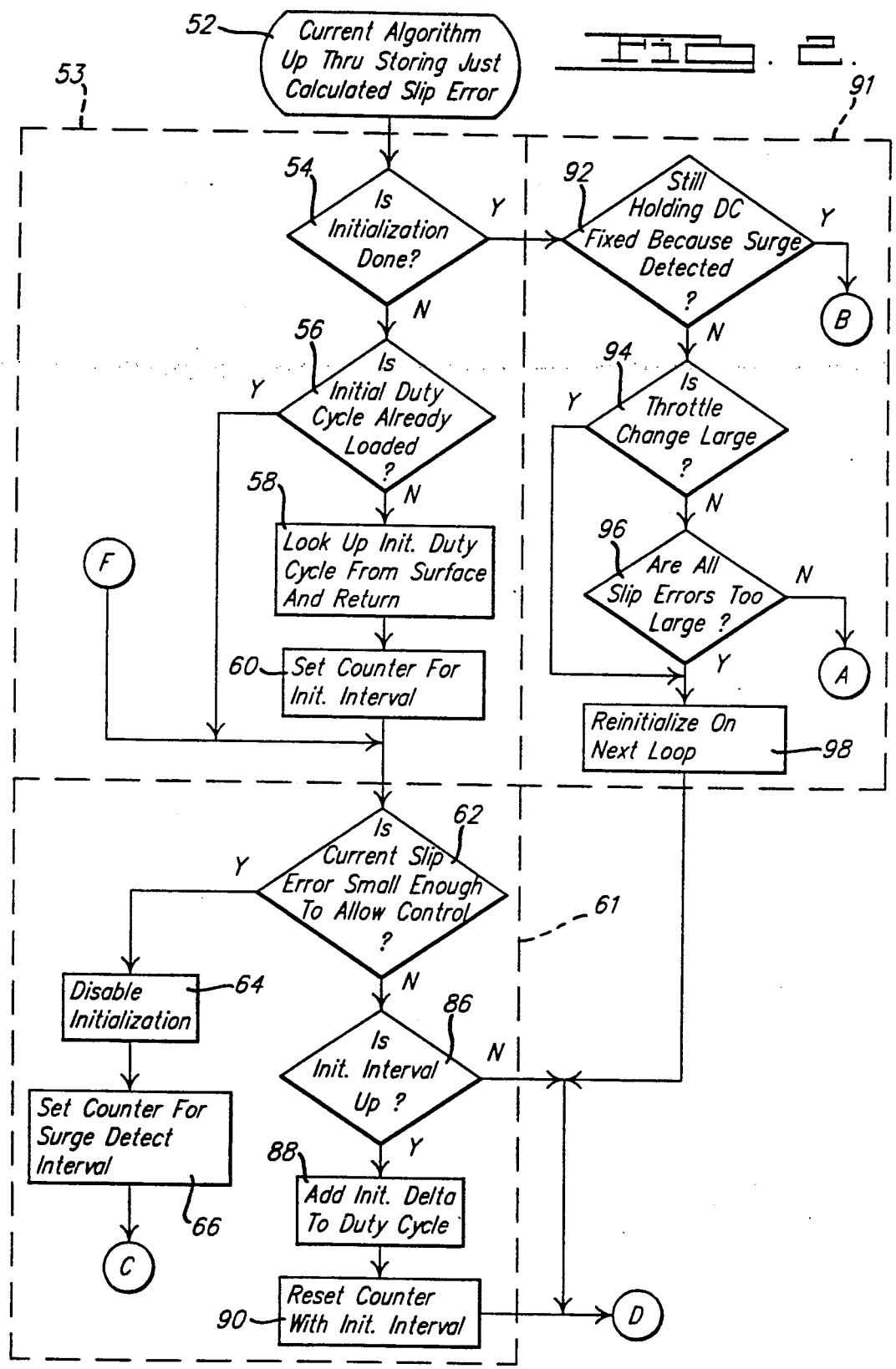
FIG. 2 is a flow chart of a partial lock-up methodology according to the present invention.

The present invention provides a methodology for solving the partial lock-up equations of block 42 in FIG. 1. Referring to FIG. 2, the methodology starts in block 52 after exiting diamond 38 in FIG. 1. The methodology enters the initialization portion 53 of the present invention. The initialization portion 53 controls the duty cycle of the lock-up clutch so that slip is gradually and smoothly pulled down from unlock to a manageable or predetermined amount. As a result, partial lock-up can be initiated without advancing to full lock-up first.

The methodology advances from bubble 52 to diamond 54 to determine whether the initialization has been previously done or completed such as by looking for a flag. If the initialization has not been completed, the methodology advances to diamond 56 and determines whether an initial duty cycle has already been obtained or loaded such as by looking for a flag. If the initial duty cycle has not been already obtained, the methodology advances to block 58 and looks up or calculates the initial duty cycle from FIGS. 7 and 8 to be described and returns. In other words, on the first pass through, the methodology calculates the initial duty cycle from a surface based on turbine speed and throttle angle using the subroutine of FIG. 6 to be described. The methodology then to block 60 and sets a counter in the transmission controller (not shown) for an initialization interval with a predetermined value such as 840 milliseconds. The methodology then advances to diamond 62 to be described.

If the initial duty cycle is already loaded in diamond 56 or the counter set in block 60, the methodology advances to an open loop roundup portion 61 of duty cycle vs. time to gradually step up of the duty cycle to avoid going into full lock-up immediately. The methodology advances from either diamond 56 or block 60 to diamond 62 and determines whether a current slip error is less than a predetermined value stored in memory of the transmission controller to allow control. In other words, in each subsequent pass, the methodology checks the current slip error to see if it is less than a predetermined value such as 40 r.p.m.—the level at which proportional integral differential (PID) control to be described takes over. If the current slip error is less than the predetermined value to allow control, the methodology advances to block 64 and disables the initialization. The methodology then advances to block 66 and sets a counter for a surge detect interval. The methodology then advances to block 68 shown in FIG. 5.

In block 68, the methodology performs the PID control. The purpose of the PID control is to calculate the required change in duty cycle to control the slip between the engine and turbine speeds to a predetermined value such as 120 r.p.m. The methodology calculates a proportional slip error term from the current and last slip errors. The methodology interpolates a delta duty cycle proportional term based on the proportional error according to the following equation:

$$\text{Delta Duty Cycle} - C[E(K) - E(K-1)]$$

where:

$E(K)$ = Current Slip Error
$E(K-1)$ = Previous Slip Error
$E(K-2)$ = Slip Error Two Loops Ago
$C$ = Look-Up Table Slope The methodology adds the delta to or subtracts it from the duty cycle, keeping track of the appropriate sign.

The methodology then advances from block 68 to block 70 and adds the delta duty cycle to the original duty cycle term. The methodology then advances to block 72 and interpolates a delta duty cycle integral term according to the following equation:

$$\text{Delta Duty Cycle} - C[E(K)]$$

The methodology then advances from block 72 to block 74 and adds the delta duty cycle term to the duty cycle. In other words, the methodology calculates integral and differential terms and incorporates them into the duty cycle. The methodology then advances to block 76 and interpolates the delta duty cycle differential term according to the following equation:

$$\text{Delta Duty Cycle} - C[E(K) - 2E(K-1) + E(K-2)]$$

The methodology then advances to block 78 and adds the delta duty cycle to the duty cycle. The methodology then advances to block 80 and shifts the last slip error into the slip error of two program loops which have previously occurred. The methodology then advances to block 82 and shifts the current slip error into the last or previous slip error. The methodology then advances to bubble 84 and returns to the main or current algorithm of FIG. 1. It should be appreciated that the methodology ends with a final duty cycle value.

Referring to FIG. 2 again, if the current slip error is not less than the predetermined value in diamond 62, the methodology advances to diamond 86 and determines whether the initialization interval is up or expired by checking the counter. If the initialization interval has not expired, the methodology advances to block 80 previously described. If the initialization interval has expired, the methodology advances to block 88 and adds an initialization delta term to the duty cycle. In other words, the methodology adds a value such as 0.8% of the duty cycle to the duty cycle every time the initialization interval times out until the slip error falls below the predetermined value of 40 r.p.m. for PID control previously described. The methodology then advances to block 90 and resets the counter with the initialization interval. The methodology then advances to block 80 previously described.

If the initialization is completed in diamond 54, the methodology advances to a transient throttle/large error detecting portion 91 of the present invention. The purpose of this portion 91 is to monitor throttle angle changes and slip errors for values large enough to warrant reinitialization and to do so if such are observed. With this portion 91, large duty cycle swings having the potential for producing surge can be avoided in transient maneuvers.

The methodology advances from diamond 54 to diamond 92 and determines whether the duty cycle (DC) is still being held fixed because a surge was detected. If the duty cycle is not being held fixed, the methodology advances to diamond 94 and determines whether a throttle angle change is greater than a predetermined value stored in memory. In other words, the methodology begins after initialization is completed or disabled and determines that the surge detection did not trigger a fix of the duty cycle. The methodology then calculates the change in throttle angle and compares it to a predetermined value such as 2.6 degrees per 28 millisecond loop—a rate representing a heavy throttle "stab".

If the throttle angle change is not greater than the predetermined value, the methodology advances to diamond 96 and checks and determines whether all three slip errors: the current one, the last one, and the one from two loops ago, are greater than a second predetermined value stored in memory such as 150 r.p.m. The predetermined value of 150 r.p.m. represents a level of error that could be produced by a small but continuous throttle angle change. If all three slip errors are greater than the second predetermined value, the methodology advances to block 98 and sets the duty cycle for reinitialization as previously described, on the next program loop. The methodology then advances to block 80 previously described. If the throttle change is greater than the first predetermined value in diamond 94, the methodology clears flags and advances to block 98 previously described so that the methodology will re-enter initialization on the next pass or loop.

Figure 3:
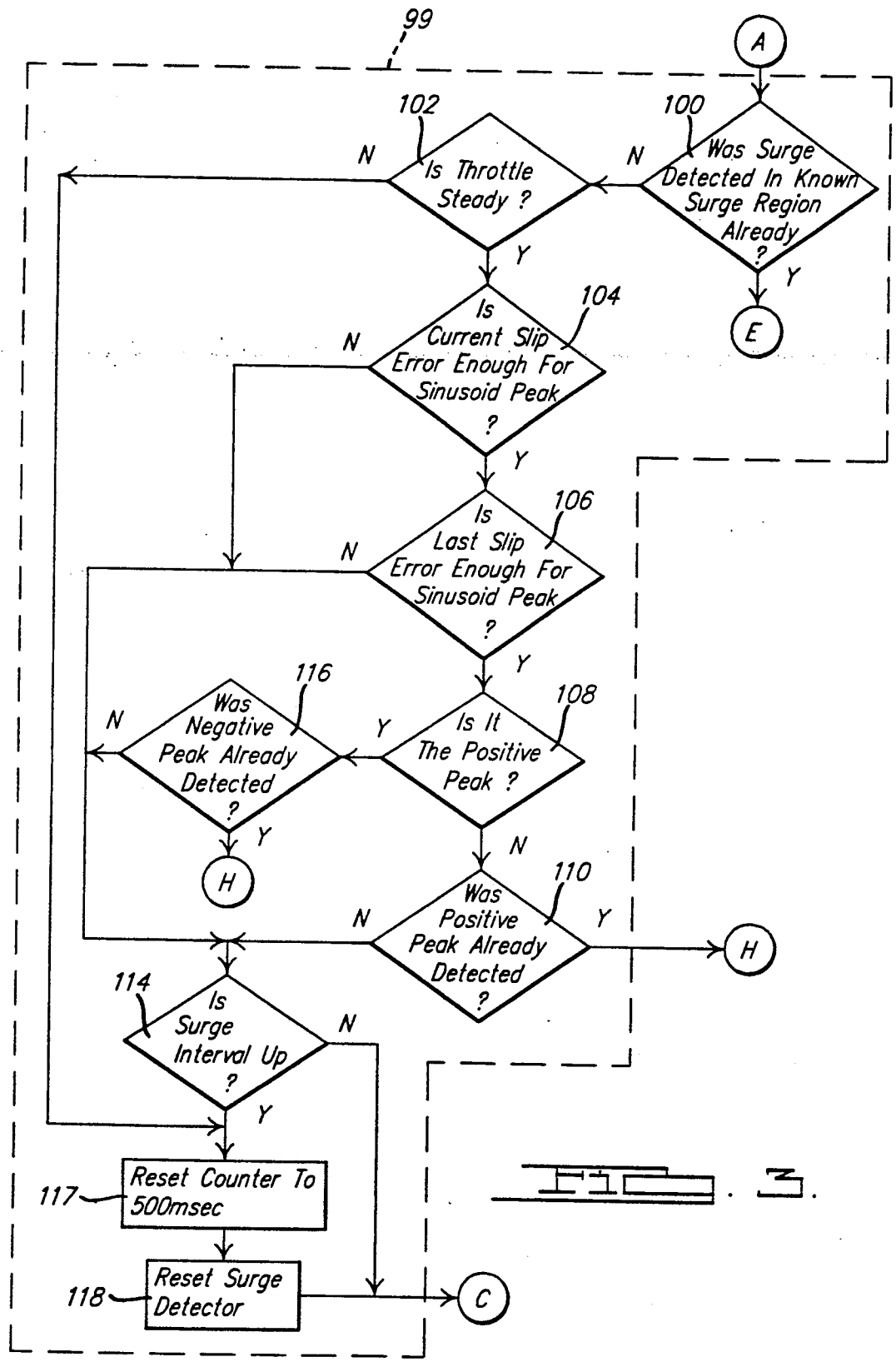
FIG. 3 is a continuation of the flow chart for the partial lock-up methodology of FIG. 2.

If all three slip errors are not greater than the second predetermined value in diamond 96, the methodology advances to the surge detection portion 99 of the present invention shown in FIG. 3. The purpose of the surge detection portion 99 is to monitor slip for sinusoidal oscillations and to reinitialize the methodology if any are observed. As a result, if surge does get started, the methodology can catch itself and avoid continuing the problem.

The methodology advances from diamond 96 to diamond 100 and determines whether surge was detected in a known surge region already. In other words, after passing through the transient throttle portion 91 clearly, the methodology checks to see if surge was first detected in a surge region, i.e., a surge producing combination of turbine speed $N_t$ and throttle angle. If so, the methodology advances to diamond 128 to be described rather than wasting time checking or detecting for surge.

If surge was not detected in a known surge region already, the methodology advances to diamond 102 and determines whether the throttle angle is steady or constant. In other words, upon clearing the known surge region check, the methodology begins by determining that the throttle angle change is less than a predetermined value such as 0.1 degrees—so that the system is essentially in steady state operation. If the throttle angle is steady, the methodology advances to diamond 104 and determines whether the current slip error is enough for a sinusoid peak. In other words, as long as the throttle angle is steady, the methodology spends the next 500 ms. scanning the last two slip errors for the peaks of a sinusoidal oscillation. The 500 ms. amount, which was loaded into a counter upon exiting the initialization portion 53, corresponds to a 2 hz frequency, the low end of the surge range.

If the current slip error is enough for a sinusoid peak in diamond 104, the methodology advances to diamond 106 and determines whether the last slip error is enough for a sinusoid peak. If the last slip error is enough for a sinusoid peak, the methodology advances to diamond 108 and determines whether the last slip error is the positive peak. If the last slip error is not the positive peak, the methodology advances to diamond 110 and determines whether the positive peak was already detected. If the positive peak was already detected, the methodology advances to the surge region check/low gain control portion 111 and block 112 to be described. If the positive peak was not already detected, the methodology advances to diamond 114 to be described.

If the last slip error is the positive peak in diamond 108, the methodology advances to diamond 116 and determines whether the negative peak was already detected. If the negative peak was already detected, the methodology advances to the surge region check/low gain control portion 111 and block 112 to be described. If the negative peak was not already detected, the methodology advances to diamond 114 to be described. Also, if the current slip error was not enough for a sinusoid peak in diamond 104 or the last slip error was not enough for a sinusoid peak in diamond 106, the methodology advances to diamond 114. It should be appreciated that when both the current and last slip errors exceed the sinusoidal peak threshold value such as 30 r.p.m. in both the positive and negative directions, the methodology concludes that surge is occurring and holds the duty cycle at a fixed value for a predetermined time period such as 840 ms. The fixed value used is the lesser of the current number or the one calculated by the duty cycle surface subroutine to be described. It should also be appreciated that with an adaptive surface, the current value would not be needed.

In diamond 114, the methodology determines whether the surge interval is up or expired by looking at the counter. If the surge interval has not expired, the methodology advances to block 68 previously described. If the surge interval has expired, the methodology advances to block 117 and resets the counter for a predetermined time period such as 500 ms. The methodology then advances to block 118 and resets the surge detector. The methodology then advances to block 68 previously described. It should be appreciated that after the fixed duty cycle interval has timed out, the methodology resets itself and passes into the surge region check. It should also be appreciated that if the throttle angle changed too much or the 500 ms. interval times out, the portion 99 of the methodology resets itself and starts over. Additionally, if the throttle angle is not steady in diamond 102, the methodology advances to block 117 previously described.

Figure 4:
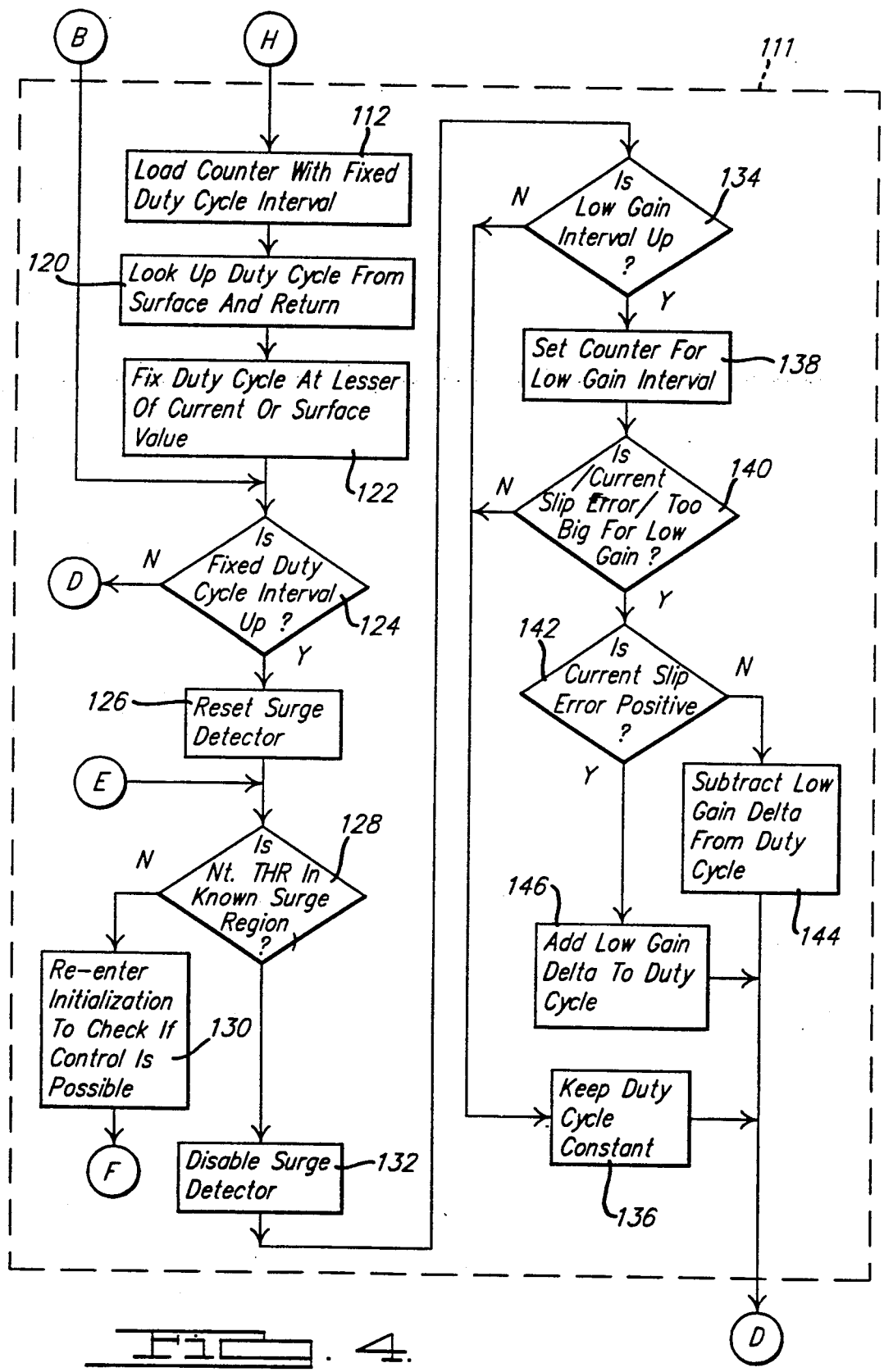
FIG. 4 is a continuation of the flow chart for the partial lock-up methodology of FIGS. 2 and 3.

In the surge region check/low gain control portion 111 of FIG. 4, the methodology determines when reinitializing from a surge detection is being performed in a surge region and to subsequently switch to a low gain control. With this portion, partial lock-up can be roughly managed for those combinations of turbine speed and throttle angle in which surge always occurs. In block 112, the methodology loads a counter with a fixed duty cycle interval. The methodology than advances to block 120 and looks up the duty cycle from the surface of FIGS. 7 and 8 to be described and returns. The methodology then advances to block 122 and fixes the duty cycle at a lesser of either the current or surface value. The methodology then advances to diamond 124. Additionally, in diamond 92, if the methodology is still holding the duty cycle fixed because surge was detected, the methodology advances to diamond 124.

Figure 9:
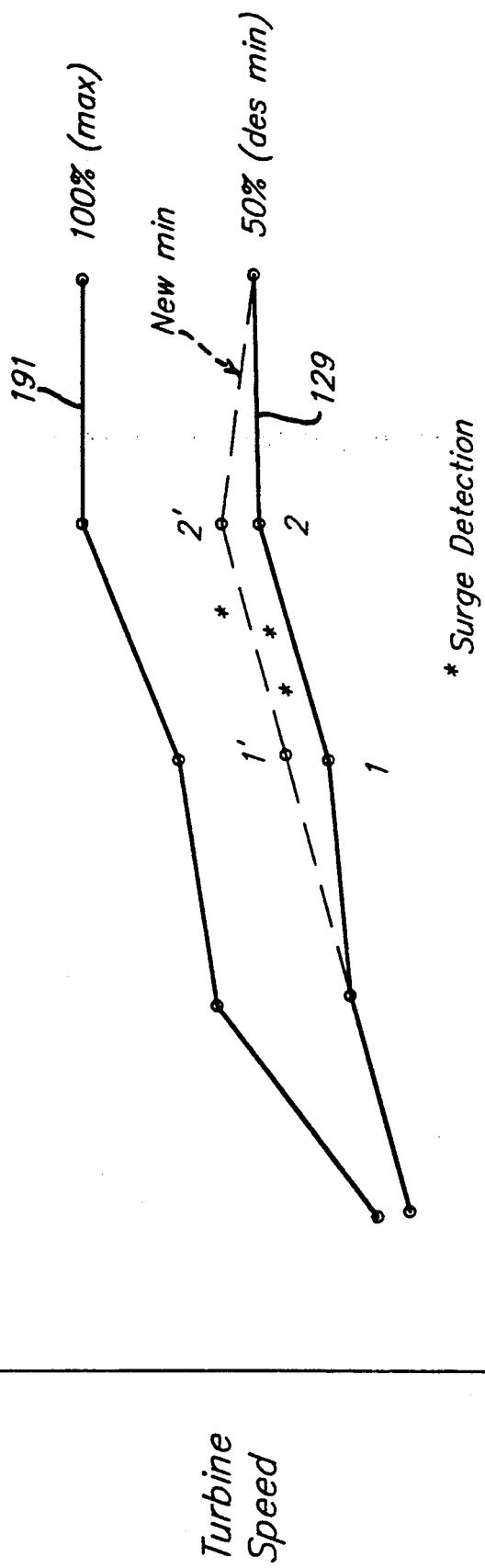
FIG. 9 is a graph of throttle angle versus turbine speed.

In diamond 124, the methodology determines whether the fixed duty cycle time interval is up or expired by looking at the counter. If the fixed duty cycle interval has not expired, the methodology advances to block 80 previously described. If the fixed duty cycle interval has expired, the methodology advances to block 126 and resets the surge detector. The methodology then advances to diamond 128 and determines whether turbine speed ($N_t$) and throttle angle (THR) are in a known surge region. In other words, the methodology starts by checking throttle angle and turbine speed against a table representing a predetermined surge region which is line 129 of FIG. 9 representing a 120 r.p.m. If not, the methodology advances to block 130 and reenters the initialization portion 53 to check if control is possible. It should be appreciated that if the system is operating outside of the surge region (above the line 129), the methodology jumps back into the initialization portion 53 to determine when to resume control. The methodology then advances to diamond 62 previously described.

If turbine speed and throttle angle are in a known surge region in diamond 128, the methodology advances to block 132 and disables the surge detector. In other words, if partial lock-up is operating inside the surge region (below the line 129), low gain control takes over. The low gain part of the methodology holds the duty cycle constant for a predetermined interval such as 1 sec. When this low gain interval times out, the methodology checks the current slip error. If the current slip error is within a ±50 r.p.m. dead band centered about the desired or predetermined slip level, the methodology does nothing, leaving the duty cycle constant. If the current slip error is above or below the dead band, the methodology adds to or subtracts from the duty cycle a predetermined value such as 0.4% of the duty cycle. Once initiated, the methodology of the surge check/low gain portion 111 continues to control partial lock-up until a throttle or error reset occurs or the methodology exits the surge region.

From block 132, the methodology advances to diamond 134 and determines whether a low gain interval is up or expired by looking at the counter. If the low gain interval has not expired, the methodology advances to diamond 136 and keeps the duty cycle constant. The methodology then advances to block 80 previously described. If the low gain interval has expired in diamond 134, the methodology advances to block 138 and sets the counter for the low gain interval. The methodology then advances to diamond 140 and determines whether the current slip error is greater than a predetermined value stored in memory for the low gain. If the current slip error is not greater than the predetermined value for low gain, the methodology advances to block 136 previously described. If the current slip error is greater than the predetermined value for low gain, the methodology advances to diamond 142 and determines whether the current slip error is a positive value. If the current slip error is not a positive value, the methodology advances to block 144 and subtracts a low gain delta or change from the duty cycle. The methodology then advances to block 80 previously described. If the current slip error is positive in diamond 142, the methodology advances to block 146 and adds a low gain delta or change to the duty cycle. The methodology then advances to block 80 previously described.

Figure 7:
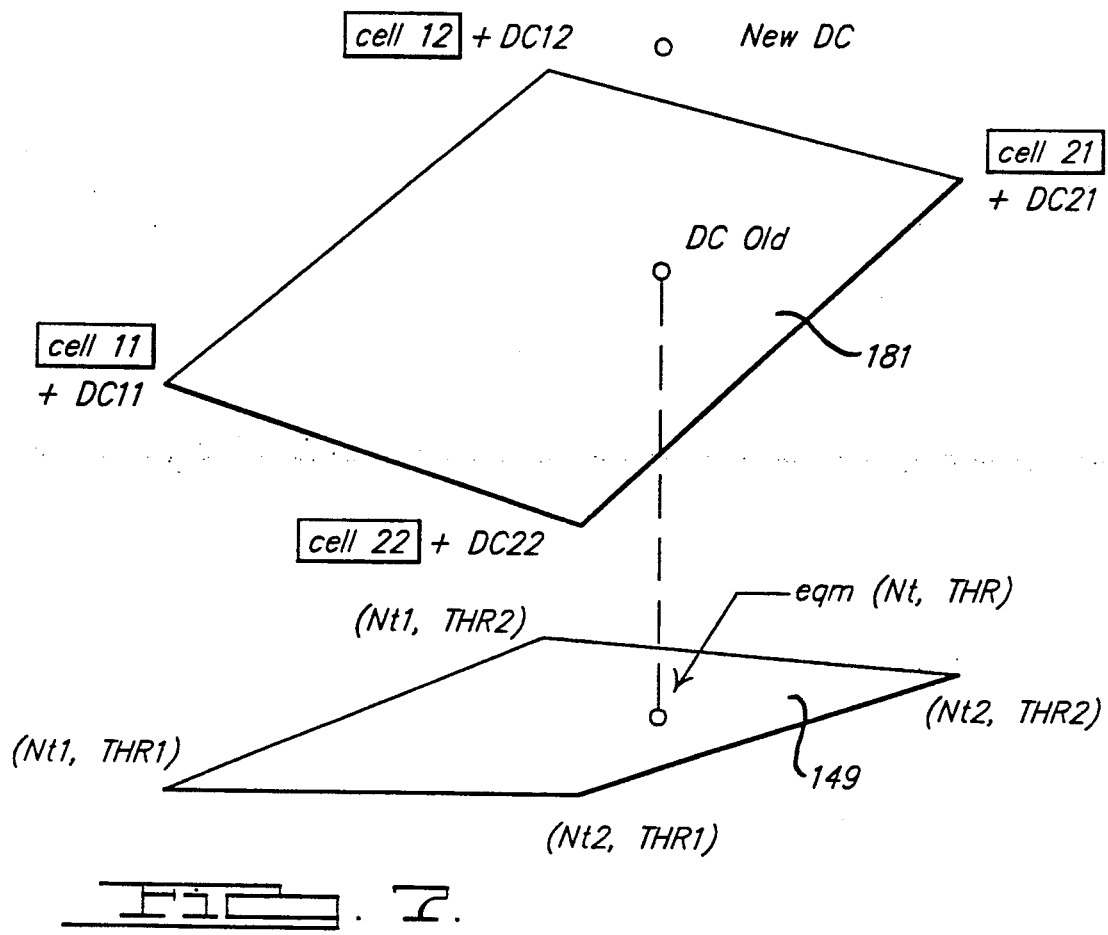
FIG. 7 is an elevational view of the surface map for the subroutine of FIG. 6.
Figure 8:
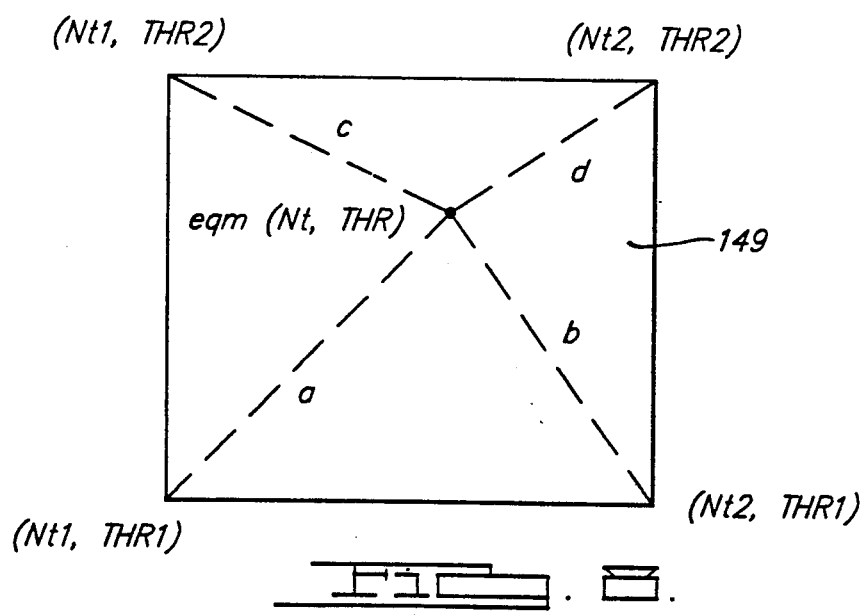
FIG. 8 is a plan view of the surface map of FIG. 7.

Referring to FIGS. 6 through 8, the methodology for the duty cycle lock-up according to the present invention is shown. The purpose of this subroutine methodology is to calculate a duty cycle from a surface 149 (FIGS. 7 and 8) based on turbine speed and throttle angle. With this methodology, the duty cycle is reinitialized to where it would be in equilibrium (eqm) under the current speed and loading operating conditions. Referring to FIGS. 7 and 8, the surface 149 is really a series of six duty cycle versus throttle angle tables, each having a turbine speed "pointer". These tables were derived empirically by averaging duty cycle traces while holding turbine speed and throttle angle constant.

The subroutine or methodology for the duty cycle lock-up enters through bubble 150 and advances to block 152. In block 152, the methodology uses turbine speed to point to a low reference duty cycle versus throttle angle table. With an adaptive duty cycle surface only, the corresponding duty cycle adaptive cells are added to low reference break points. The methodology then advances to block 154 and interpolates the low reference duty cycle with the current throttle angle value. The methodology then advances to block 156 and points to a high reference duty cycle versus throttle angle table. With an adaptive DC surface only, the duty cycle adaptive cells are added to high reference break points. The methodology then interpolates the high reference duty cycle with the current throttle angle value. The methodology then advances to block 158 and interpolates between the high and low duty cycle reference points with the current turbine speed value. The methodology then advances to block 160 and saves this information as the initial duty cycle. The methodology then returns through bubble 162.

Figure 10:
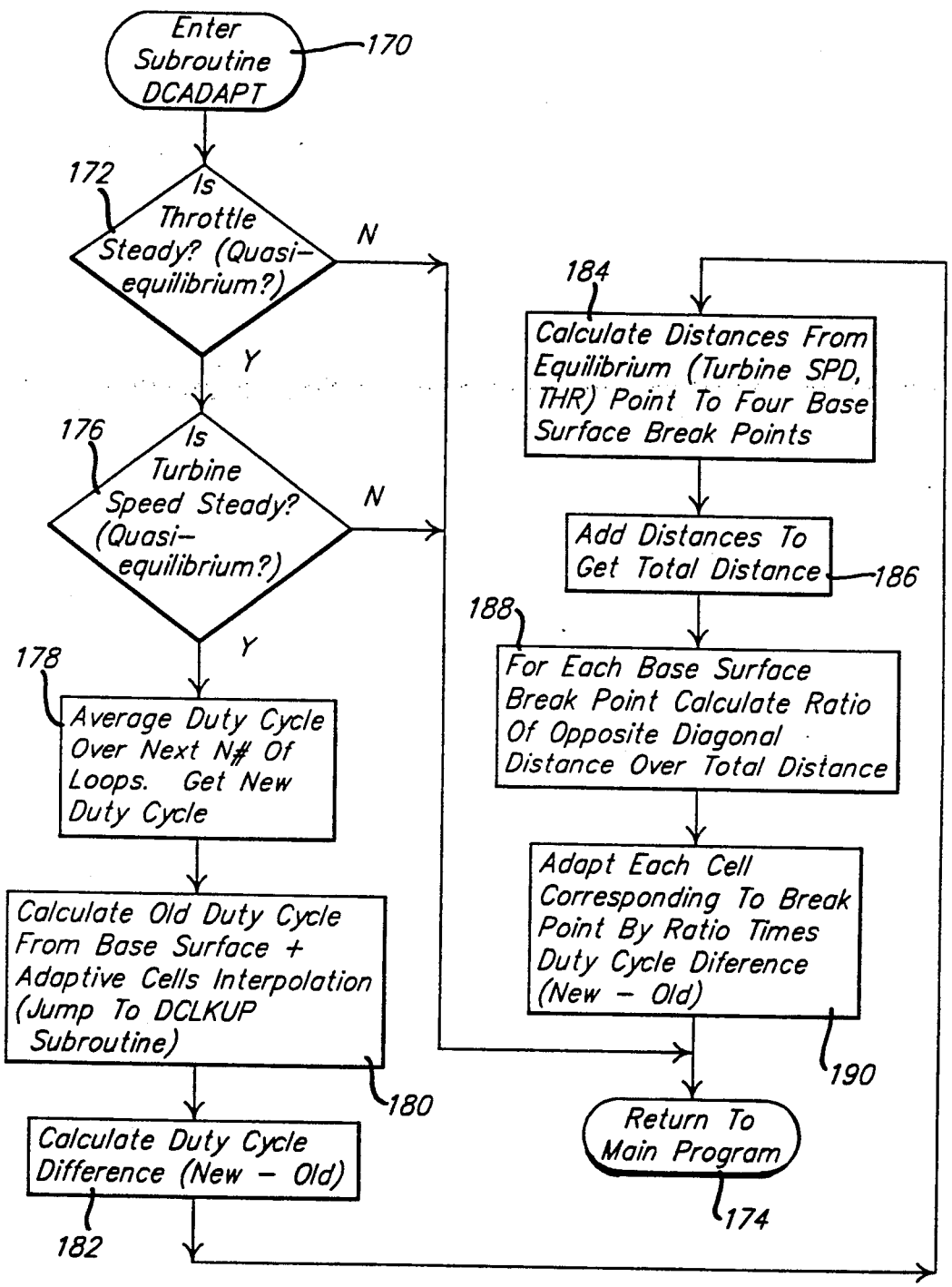
FIG. 10 is a flow chart of an adaptive duty cycle surface methodology according to the present invention.

Referring to FIGS. 7, 8 and 10, a methodology for an adaptive duty cycle surface according to the present invention is shown. The methodology enters through bubble 170 and advances to diamond 172. In diamond 172, the methodology determines whether the throttle angle is steady or at quasiequilibrium as previously described. If the throttle angle is not steady, the methodology advances to bubble 174 and returns to the main program or methodology. If the throttle angle is steady, the methodology advances to diamond 176 and determines whether turbine speed ($N_t$) is steady or at quasiequilibrium. If not, the methodology advances to block 174 previously described. If the turbine speed is steady, the methodology advances to block 178 and averages the duty cycle over a next predetermined number of loops to obtain a new duty cycle. In other words, the methodology begins by determining which table's pointer is just below the current turbine speed which table represents the low reference. The methodology then interpolates this table based on throttle angle to get a low reference duty cycle point.

The methodology advances to block 180 and calculates an old duty cycle from the base surface 181 (FIGS. 7 and 8) plus adaptive cells interpolation (jump to DCLKUP subroutine previously described). The methodology then advances to block 182 and calculates the duty cycle difference (new-old). The methodology then advances to block 184 and calculates distances from equilibrium (eqm) on surface 149 to the four base surface break points forming surface 181. The methodology then advances to block 186 and adds the distance to get the total distance. The methodology then advances to block 188 and calculates the ratio of opposite diagonal distance over total distance for each base surface break point. The methodology then advances to block 190 and adapts each cell corresponding to the break point by the ratio times duty cycle difference (new-old). The methodology then advances to bubble 174 and returns to the main program or methodology. It should be appreciated that the methology calculates a high reference duty cycle point from the table with its turbine speed pointer just above the current value and interpolates based on current turbine speed between the high and low reference points to get the duty cycle.

As to the adaptive duty cycle surface methodology, the base of the current duty cycle surface is a six by eight array—six turbine speed break points by eight throttle angle break points. The interval between turbine speed break points is 512 r.p.m., while that between throttle angle break points is 4.2 degrees. In order to minimize the amount of keep-alive RAM used, the base of the surface would have to be cut down to 6 by 4—i.e., 6 turbine speed break points by 4 throttle angle break points. Thus, the throttle angle interval between break points would double to 8.4 degrees. The basic 6 by 4 surface would be in ROM with experimentally determined default duty cycle values. Each turbine-throttle base point would have its own adaptive "cell" and keep-alive RAM. The 24 adaptive cells would store the adjustments for the default duty cycle values. The methodology would calculate the duty cycle as before, however, the interpolations of the low and high reference points would be done on the default duty cycle values plus the corresponding adaptive cell adjustments.

Adapting the surface occurs under steady state operation, in which turbine speed and throttle angle change very little. The methodology first averages the duty cycle over many loops. It then computes the difference between this "new" equilibrium value and the "old" one it calculated from the surface 181 and cell interpolations. Next, the methodology calculates the "distances" and throttle angle and turbine speed "lengths" between the equilibrium point (eqm) and the four surrounding surface base points of surface 181. The methodology then adapts each of the four (4) cells of the base points a percentage of the new-old difference. The percentage reflects the relative "closeness" of the equilibrium point to the base point. For example, the percentage could be a ratio of the "length" of the opposite half of the "diagonal" to the total "distance" of the equilibrium point to the four (4) base points. In this way, the methodology makes the biggest adjustments to the closest base points (cells) and accounts for the entire new-old duty cycle difference.

Referring to FIG. 9, this figure shows two regions: a fifty (50) percent line 129 representing the throttle angle and turbine speed combinations above which half of the vehicles do not surge while the hundred (100) percent line 191 represents the combinations above which all vehicles do not surge. The hundred (100) percent line 191 can be considered the maximum surge and the fifty (50) percent line 129 the desired minimum surge region. It should be appreciated that the fifty (50) percent number is entirely arbitrary and a higher number may be used.

Figure 11:
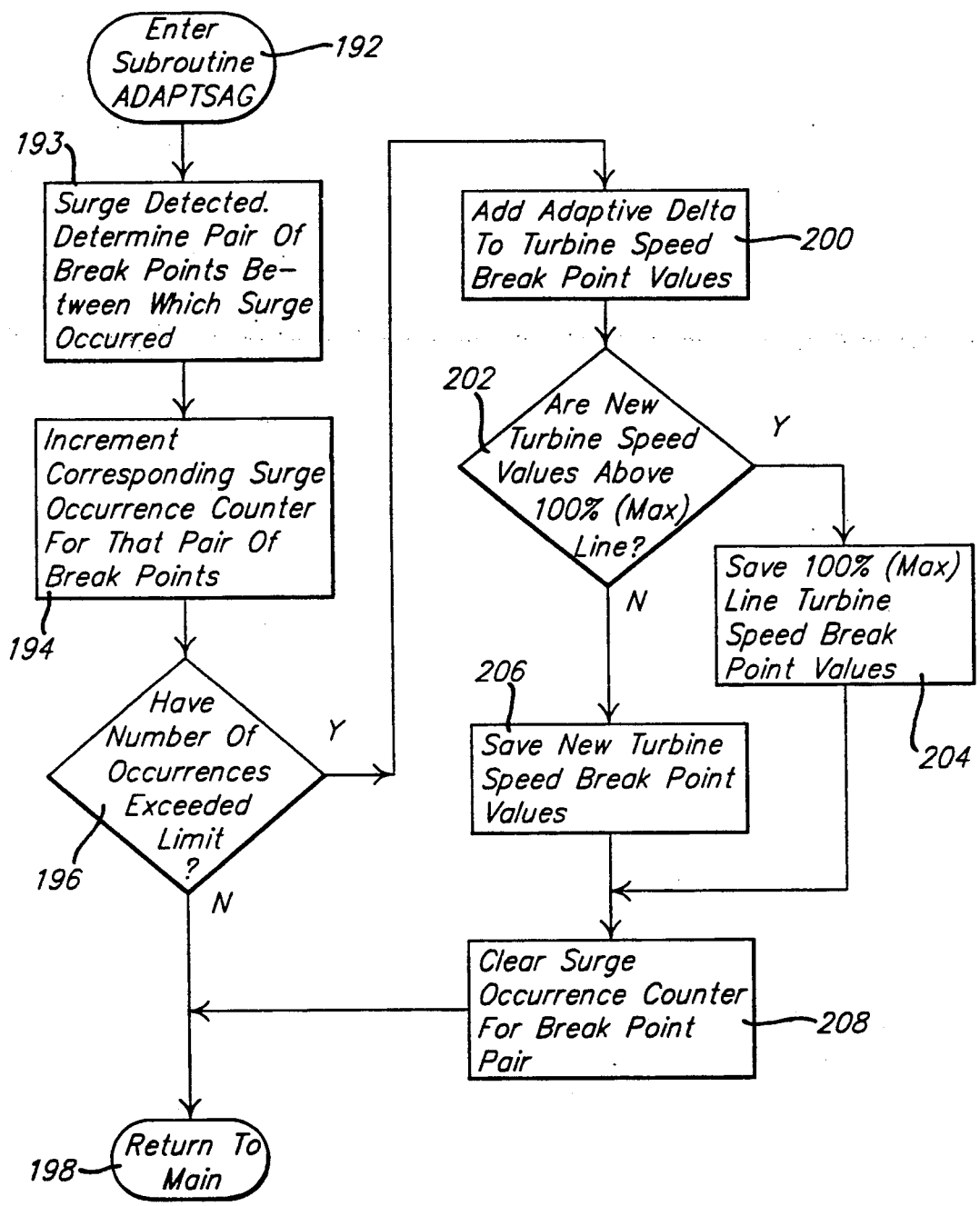
FIG. 11 is a flow chart of an adaptive surge region check methodology according to the present invention.

Referring to FIG. 11, the adaptive surge region check methodology is shown. The methodology enters through bubble 192 and advances to block 193. In block 193, methodology determines a pair of break points between which the surge occurred. The methodology then advances to block 194 and increments a corresponding surge occurrence counter for that pair of break points. The methodology then advances to diamond 196 and determines whether a number of occurrences have exceeded a predetermined value or limit. If not, the methodology advances to bubble 198 and returns to the main program or methodology. If the number of occurrences have exceeded the predetermined value, the methodology advances to block 200 and adds the adaptive delta to turbine speed break point values. The methodology then advances to diamond 202 and determines whether the new turbine speed values are above the hundred (100) percent (max) line 191 in FIG. 9. If so, the methodology advances to block 204 and saves the hundred (100) percent line 191 turbine speed break point values. If not, the methodology advances to block 206 and saves the new turbine speed break point values. The methodology advances from blocks 204 and 206 to block 208 and clears the surge occurrence counter for the break point pair. The methodology then advances to bubble 198 as previously described. It should be appreciated that this methodology would have a table of fixed throttle break points in ROM versus adaptive turbine speed values and keep-alive RAM. The default values for the adaptive turbine speed RAM bytes would be the points on the desired minimum line 129. The surge region check would function as before, with the adaptive turbine speed line as a boundary between low gain and PID control. It should also be appreciated that the methodology would count, in separate RAM locations, the number of surge detections that occurred above the adaptive turbine speed line. When the count hits a certain predetermined number, the methodology would adapt it to turbine speed values up a specified or predetermined amount. For example, if three (3) surge detections occurred between points 1 and 2 of FIG. 9, the methodology would raise those points up to 1' and 2', respectively. The methodology would adapt only as far as the hundred (100) percent line 191. It would ignore surge detections above that line as being false.

The present invention has been described in an illustrative manner. It is to be understood that the terminology which has been used is intended to be in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. In a vehicle having an engine and a throttle means and a transmission system including an input member, an output member, a torque converter assembly for transmitting torque between the engine and the input member of the transmission, the torque converter assembly having a turbine operatively connected to the input member, a gear assembly for changing the ratio of torque between the input member and output member, a frictional unit for coupling the turbine of the torque converter assembly to the engine, at least one solenoid-actuated valve being movable in response to the presence or absence of electrical power for directing fluid flow from a fluid source, a slave valve, a plurality of input sensors for providing signals indicative of predetermined conditions, and a controller having memory for processing and storing the signals and predetermined values and providing output signals, a method of controlling the difference between the rotational speed of the output member of the engine and the rotational speed of the turbine of the torque converter assembly, said method comprising the steps of:

checking a plurality of first predetermined conditions by the input sensors to determine whether the turbine of the torque converter assembly is precluded from being partially frictionally coupled to the engine;

determining whether any of the checked plurality of first predetermined conditions prevent the turbine from being partially frictionally coupled to the engine by comparing them to stored values for the first predetermined conditions in memory which prevent partial frictional coupling of the turbine;

setting a plurality of second predetermined conditions to uncouple the turbine from the engine if any first predetermined condition prevents the turbine from being partially frictionally coupled to the engine;

setting predetermined initial conditions to control a duty cycle of the solenoid-actuated valve which allows and prevents fluid flow to the slave valve to allow or prevent fluid flow to a frictional unit which frictionally couples the turbine to the engine;

determining whether the method is at the start of a duty cycle period of the solenoid-actuated valve for partially coupling the turbine of the torque converter assembly to the engine;

checking a plurality of third predetermined conditions by the input sensors that would allow the turbine to be fully frictionally coupled to the engine to eliminate the difference between speeds if the method is at the start of a duty cycle period of the solenoid-actuated valve for controlling the slave valve;

determining whether the checked plurality of third predetermined conditions allow the turbine to be fully frictionally coupled;

solving a first set of predetermined equations for the duty cycle of the solenoid-actuated valve for full frictional coupling of the turbine if determined that the turbine is allowed to be fully frictionally coupled;

calculating a predetermined change for the duty cycle of the solenoid-actuated valve to control slip during partial frictional coupling of the turbine of the torque converter assembly; and duty cycling the solenoid-actuated valve based on the value for the solved duty cycle.

2. A method as set forth in claim 1 wherein after said step of determining whether any of the checked plurality of first predetermined conditions prevent the turbine from being partially frictionally coupled, said method including the steps of:

determining whether the turbine is presently being partially frictionally coupled to the engine by looking for a flag;

checking the position of the throttle means in the engine by an input sensor and the speed of the turbine by an input sensor to determine whether the turbine is to be unlocked if the turbine is presently being partially frictionally coupled; and determining whether the turbine is to be uncoupled based on the checked throttle position and turbine speed.

3. A method as set forth in claim 2 including the step of setting a plurality of second predetermined conditions to uncouple the turbine from the engine if either the checked throttle position or turbine speed prevents the turbine from being frictionally coupled to the engine if the turbine is to be uncoupled.

4. In a vehicle having an engine and a throttle means and a transmission system including an input member, an output member, a torque converter assembly for transmitting torque between the engine and the input member of the transmission, the torque converter assembly having a turbine operatively connected to the input member, a gear assembly for changing the ratio of torque between the input member and output member, a frictional unit for coupling the turbine of the torque converter assembly to the engine, at least one solenoid-actuated valve being movable in response to the presence or absence of electrical power for directing fluid flow from a fluid source, a slave valve, a plurality of input sensors for providing input signals indicative of predetermined conditions, and a controller having memory for processing and storing the signals and predetermined values and providing output signals, a method of controlling the difference between the rotational speed of the output member of the engine and the rotational speed of the turbine of the torque converter assembly by controlling the frictional unit partial engagement and disengagement between the turbine and the output member of the engine, said method comprising the steps of:

initializing a duty cycle for at least one solenoid-actuated valve for controlling partial engagement of the frictional unit;

gradually incrementing the duty cycle to a first predetermined value;

determining whether a current slip error is less than a second predetermined value;

calculating a change in duty cycle to control slip to the first predetermined value if the current slip error is less than the second predetermined value;

calculating a new duty cycle based on the calculated change in duty cycle;

monitoring slip for sinusoidal oscillations if the current slip error is not less than the second predetermined value;

fixing the value of the duty cycle for a predetermined time period if sinusoidal oscillations have been monitored; and duty cycling the solenoid-actuated valve based on either the fixed value or calculated value for the duty cycle.

5. In a vehicle having an engine and a throttle means and a transmission system including an input member, an output member, a torque converter assembly for transmitting torque between the engine and the input member of the transmission, the torque converter assembly having a turbine operatively connected to the input member, a gear assembly for changing the ratio of torque between the input member and output member, a frictional unit for coupling the turbine of the torque converter assembly to the engine, at least one solenoid-actuated valve being movable in response to the presence or absence of electrical power for directing fluid flow from a fluid source, a slave valve, a plurality of input sensors for providing input signals indicative of predetermined conditions, and a controller having memory for processing and storing the signals and predetermined values and providing output signals, a method of controlling the difference between the rotational speed of the output member of the engine and the rotational speed of the turbine of the torque converter assembly by controlling the frictional unit partial engagement and disengagement between the turbine and the output member of the engine, said method comprising the steps of:
- initializing a duty cycle for at least one solenoid-actuated valve for controlling partial engagement of the frictional unit;
- determining whether a current slip error is less than a first predetermined value;
- interpolating a change in duty cycle to control slip to a second predetermined value if the current slip error is less than the first predetermined value;
- adding the interpolated change in duty cycle to the value of the original duty cycle to obtain a new duty cycle value; and
- duty cycling the solenoid-actuated valve based on the new duty cycle value.

6. In a vehicle having an engine and a throttle means and a transmission system including an input member, an output member, a torque converter assembly for transmitting torque between the engine and the input member of the transmission, the torque converter assembly having a turbine operatively connected to the input members, a gear assembly for changing the ratio of torque between the input member and output member, a frictional unit for coupling the turbine of the torque converter assembly to the engine, at least one solenoid-actuated valve being movable in response to the presence or absence of electrical power for directing fluid flow from a fluid source, a slave valve, a plurality of input sensors for providing input signals indicative of predetermined conditions, and a controller having memory for processing and storing the signals and predetermined values and providing output signals, a method of controlling the difference between the rotational speed of the output member of the engine and the rotaional speed of the turbine of the torque converter assembly by controlling the frictional unit partial engegement and disengagement between the turbine and the output member of the engine, said method comprising the steps of:
- initializing a duty cycle for at least one solenoid-actuated valve for controlling partial engagement of the frictional unit;
- gradually incrementing the duty cycle to a first predetermined value;
- calculating a current slip error of the difference between a current value of slip and the first predetermined value;
- interpolating a change in duty cycle based on the calculated current slip error;
- adding the interpolated change in duty cycle to the value of the original duty cycle to obtain a new duty cycle value; and
- duty cycling the solenoid-actuated valve based on the new duty cycle value.

* * * * *

UNITED STATES PATENT AND TRADEMARK OFFICE
CERTIFICATE OF CORRECTION

PATENT NO. : 5,202,833
DATED : April 13, 1993
INVENTOR(S) : Fodale

It is certified that error appears in the above-indentified patent and that said Letters Patent is hereby corrected as shown below:

On title page, item [73] insert --Chrysler Corporation--.

Signed and Sealed this

Sixteenth Day of August, 1994

Attest:

BRUCE LEHMAN

*Attesting Officer*     *Commissioner of Patents and Trademarks*